United States Patent
Hamaguchi

(10) Patent No.: US 12,417,648 B2
(45) Date of Patent: Sep. 16, 2025

(54) IMAGE ANALYSIS APPARATUS, IMAGE ANALYSIS METHOD, AND PROGRAM

(71) Applicant: FUJIFILM Corporation, Tokyo (JP)

(72) Inventor: Yuya Hamaguchi, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 568 days.

(21) Appl. No.: 17/839,468

(22) Filed: Jun. 13, 2022

(65) Prior Publication Data

US 2022/0309815 A1    Sep. 29, 2022

Related U.S. Application Data

(63) Continuation of application No. PCT/JP2020/046887, filed on Dec. 16, 2020.

(30) Foreign Application Priority Data

Dec. 16, 2019  (JP) ................. 2019-226239

(51) Int. Cl.
*G06V 30/30* (2022.01)
*G06V 10/82* (2022.01)
(Continued)

(52) U.S. Cl.
CPC .............. *G06V 30/30* (2022.01); *G06V 10/82* (2022.01); *G06V 30/12* (2022.01);
(Continued)

(58) Field of Classification Search
CPC ................... G06V 30/00–43; G06V 10/00–86
See application file for complete search history.

(56) References Cited

U.S. PATENT DOCUMENTS 5,157,736 A * 10/1992 Boyer ................ G16C 20/70
382/113
11,581,067 B2   2/2023 Kwon et al.
(Continued)

FOREIGN PATENT DOCUMENTS

CN    108334839    7/2018
CN    110046692    7/2019
(Continued)

OTHER PUBLICATIONS

Salker et al Molecular Structure Extraction for Documents Using Deep Learning Journal of Chemical Information and Modeling Feb. 13, 2019. (Year: 2019).*
(Continued)

*Primary Examiner* — Sean T Motsinger
(74) *Attorney, Agent, or Firm* — JCIPRNET

(57) ABSTRACT

There are provided an image analysis apparatus, an image analysis method, and a program for implementing an image analysis method that can, when text information about a structural formula of a compound is generated from an image showing the structural formula, cope with a change in the way of drawing of the structural formula.
An image analysis apparatus according to one embodiment of the present invention includes a processor, and the processor is configured to generate, on the basis of a feature value of a subject image showing a structural formula of a subject compound, symbol information representing the structural formula of the subject compound with a line notation, by using an analysis model. The analysis model is a model created through machine learning using a learning image and symbol information representing a structural formula of a compound shown by the learning image with a line notation.

15 Claims, 8 Drawing Sheets

(51) Int. Cl.
    *G06V 30/12*   (2022.01)
    *G06V 30/18*   (2022.01)
    *G06V 30/19*   (2022.01)
    *G06V 30/41*   (2022.01)
    *G06V 30/422*  (2022.01)

(52) U.S. Cl.
    CPC .... *G06V 30/1801* (2022.01); *G06V 30/19147* (2022.01); *G06V 30/41* (2022.01); *G06V 30/422* (2022.01)

(56) References Cited

U.S. PATENT DOCUMENTS

| | | | |
|---|---|---|---|
| 2004/0090439 A1* | 5/2004 | Dillner | G06V 30/422 717/100 |
| 2012/0141032 A1* | 6/2012 | Ouyang | G06V 30/347 382/187 |
| 2014/0301608 A1* | 10/2014 | Karthikeyan | G06V 30/422 382/113 |
| 2016/0239751 A1* | 8/2016 | Mosterman | G06N 7/01 |
| 2017/0011262 A1* | 1/2017 | Onis | G06V 30/347 |
| 2017/0364744 A1* | 12/2017 | Savchenkov | G06V 30/19167 |
| 2018/0067640 A1* | 3/2018 | Jiang | G06F 17/10 |
| 2022/0230713 A1* | 7/2022 | Maragakis | G06N 3/045 |
| 2022/0309815 A1* | 9/2022 | Hamaguchi | G06V 30/18057 |
| 2022/0327158 A1* | 10/2022 | Hamaguchi | G06N 3/0464 |
| 2022/0335081 A1* | 10/2022 | Kumar | G06V 30/413 |

FOREIGN PATENT DOCUMENTS

| | | |
|---|---|---|
| JP | 2012021806 | 2/2012 |
| JP | 2013061886 | 4/2013 |
| JP | 2013101510 | 5/2013 |
| JP | 2014182663 | 9/2014 |
| WO | 2019004437 | 1/2019 |

OTHER PUBLICATIONS

Fumiyasu Sato et al., "Proposal of the Uses of a Formal Grammar to Recognize Condensed Structural Formulas for Optical Chemical Structure Recognition" with English abstract, Journal of Information Processing Society of Japan, vol. 57, Nov. 2016, pp. 2467-2474.

"International Search Report (Form PCT/ISA/210) of PCT/JP2020/046887," mailed on Mar. 16, 2021, with English translation thereof, pp. 1-6.

"Written Opinion of the International Searching Authority (Form PCT/ISA/237)" of PCT/JP2020/046887, mailed on Mar. 16, 2021, with English translation thereof, pp. 1-6.

Joshua Staker et al., "Molecular Structure Extraction From Documents Using Deep Learning", Journal of Chemical Information and Modeling, Feb. 13, 2019, pp. 1-17, vol. 59, Issue 3.

"Office Action of China Counterpart Application", issued on Aug. 23, 2024, with English translation thereof, p. 1-p. 14.

"Office Action of China Counterpart Application", issued on Jan. 14, 2025, with English translation thereof, pp. 1-14.

* cited by examiner

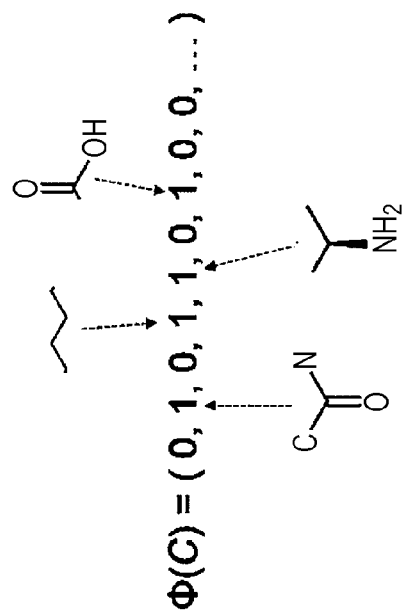
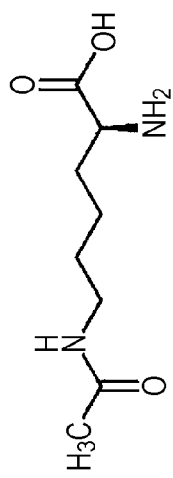
FIG. 5

FIG. 6
[Chem. 33]

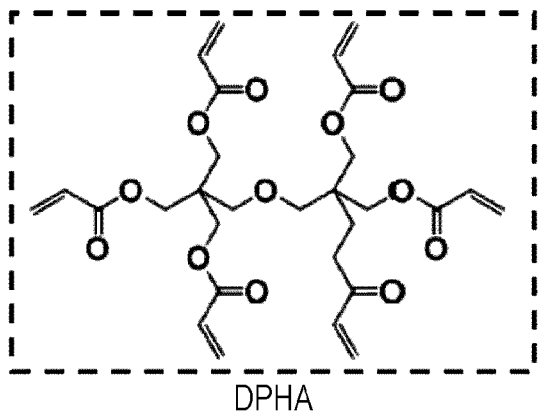

DPHA

[0143]
[Examples 13 and 14]
A method the same as that in Example 12 was used except for the transparent resin layer forming composite A being changed to transparent resin layer forming composites B and C shown below in formation of the transparent resin layer, and laminates according to Examples 13 and 14 were obtained.

[0144]

| Transparent resin layer forming composite B | |
|---|---:|
| • CEL2021P shown below (from Daicel) | 144 parts by mass |
| • IRGACURE127 shown below (from BASF) | 3 parts by mass |
| • CPI-100P shown below (propylene carbonate solution) | 6 parts by mass |
| • Megaface RS-90 (from DIC) | 0.3 parts by mass |
| • Methyl ethyl ketone (MEK) | 347 parts by mass |

[0145]
CEL2021P
[Chem. 34]

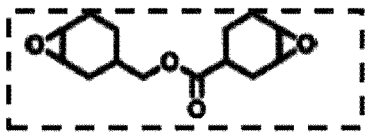

[0146]
IRGACURE127
[Chem. 35]

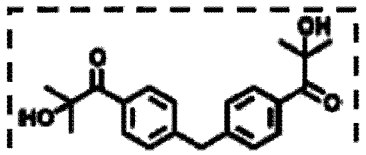

[0147]
Photocationic polymerization initiator (CPI-100P)

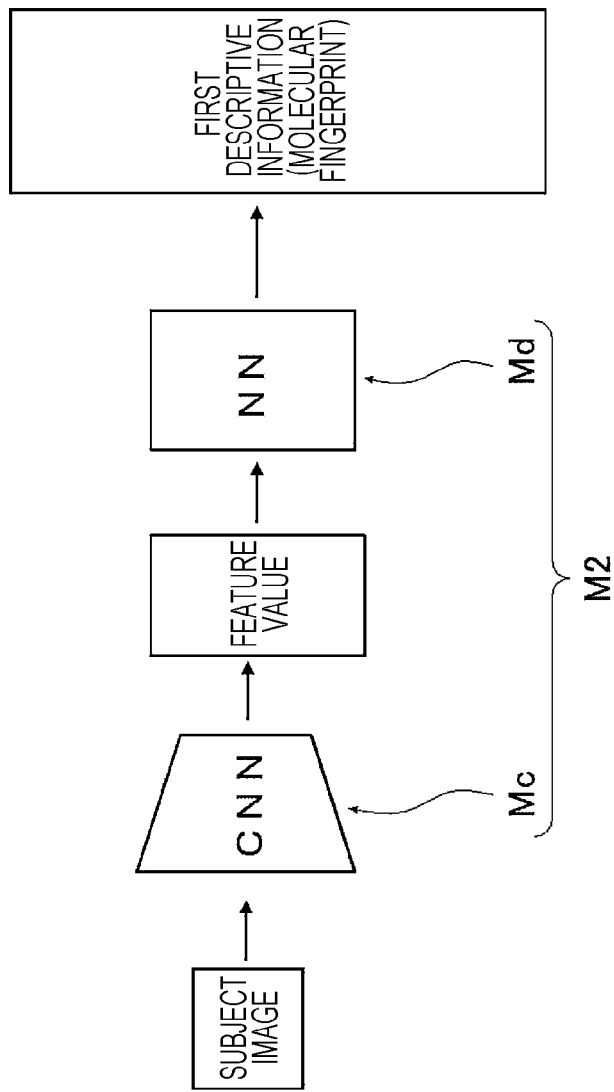

IMAGE ANALYSIS APPARATUS, IMAGE ANALYSIS METHOD, AND PROGRAM

CROSS-REFERENCE TO RELATED APPLICATIONS

This application is a Continuation of PCT International Application No. PCT/JP2020/046887 filed on Dec. 16, 2020, which claims priority under 35 U.S.C. § 119(a) to Japanese Patent Application No. 2019-226239 filed on Dec. 16, 2019. The above application is hereby expressly incorporated by reference, in its entirety, into the present application.

BACKGROUND OF THE INVENTION

1. Field of the Invention

The present invention relates to an image analysis apparatus, an image analysis method, and a program and specifically relates to an image analysis apparatus, an image analysis method, and a program for analyzing an image showing a structural formula of a compound.

2. Description of the Related Art

It is often the case that a structural formula of a compound is managed as image data and, for example, such image data is posted on the Internet or is incorporated into document data. However, with a usual search method, it is difficult to search for a structural formula of a compound managed as image data.

To enable a search for a structural formula of a compound shown by an image, a technique has been developed in which an automatic recognition technique using a computer is used to recognize a structural formula of a compound from an image of the structural formula. Specific examples of the technique include techniques described in JP2013-61886A and JP2014-182663A.

In the technique described in JP2013-61886A, text information in a chemical structure drawing (for example, atoms that constitute a compound) is recognized by pattern recognition, and line diagram information of the chemical structure drawing (for example, a bond between atoms) is recognized by using a predetermined algorithm.

In the technique described in JP2014-182663A, an image of a structural formula of a compound is read, a region (pixels) showing an atomic symbol in the image is assigned a value indicating an attribute of the atomic symbol, and a region (pixels) showing a bond symbol in the image is assigned a value indicating an attribute of the bond symbol.

SUMMARY OF THE INVENTION

In the techniques described in JP2013-61886A and JP2014-182663A, a rule is established on correspondences between parts, in an image showing a structural formula of a compound, showing partial structures (structural elements) in the structural formula and the partial structures. Then, the structural formula in the image is identified in accordance with the rule.

However, as the depicting format for a structural formula, a plurality of equivalent formats are available, and the thickness, orientation, and so on of a bond line in the structural formula may change depending on the way of drawing. In this case, to cope with different ways of drawing of the structural formula, a large number of rules for identifying partial structures depicted in various ways of drawing need to be established in advance.

With the techniques described in JP2013-61886A and JP2014-182663A, for example, an identification rule is not established for an image of a structural formula drawn in a new way of drawing, and therefore, identification might not be possible.

The present invention has been made in view of the above-described circumstances and addresses the above-described issues in the related art. Specifically, an object of the present invention is to provide an image analysis apparatus, an image analysis method, and a program for implementing an image analysis method that can, when text information about a structural formula of a compound is generated from an image showing the structural formula, cope with a change in the way of drawing of the structural formula.

To achieve the above-described object, an image analysis apparatus of the present invention is an image analysis apparatus including a processor and configured to analyze an image showing a structural formula of a compound, the processor being configured to generate, on the basis of a feature value of a subject image showing a structural formula of a subject compound, symbol information representing the structural formula of the subject compound with a line notation, by using an analysis model, the analysis model being created through machine learning using a learning image and symbol information representing a structural formula of a compound shown by the learning image with a line notation.

Preferably, the processor is configured to detect the subject image from a document including the subject image, and generate the symbol information about the structural formula of the subject compound by inputting the detected subject image to the analysis model.

Further, more preferably, the processor is configured to detect the subject image from the document by using an object detection algorithm.

Further, more preferably, the processor is configured to detect a plurality of subject images, each of which is the subject image, from the document that includes the plurality of subject images, and generate the symbol information about the structural formula of the subject compound shown by each of the plurality of subject images, by inputting the plurality of detected subject images to the analysis model on a subject image by subject image basis.

The analysis model may include a feature value output model that outputs the feature value in response to input of the subject image, and a symbol information output model that outputs the symbol information corresponding to the feature value in response to input of the feature value.

Further, the feature value output model may include a convolutional neural network, and the symbol information output model may include a recurrent neural network.

Preferably, the symbol information about the structural formula of the subject compound is formed of a plurality of symbols, and the symbol information output model specifies the symbols that form the symbol information corresponding to the feature value sequentially from a start of the symbol information, and outputs the symbol information that includes a sequence of the symbols in order of specification.

Further, the processor may be configured to generate a plurality of pieces of symbol information, each of which is the symbol information, about the structural formula of the subject compound on the basis of the feature value of the subject image by using the analysis model. In this case, more preferably, the symbol information output model calculates, for each piece of symbol information among the plurality of pieces of symbol information, output probabilities of the plurality of symbols that form the piece of symbol information, and calculates an output score of the piece of symbol information on the basis of the calculated output probabilities of the plurality of symbols, and outputs a predetermined number of pieces of symbol information in accordance with the calculated output score.

Further, more preferably, the processor is configured to perform a determination process of determining, for each of the pieces of symbol information output by the symbol information output model, whether an error in terms of representation is present, and output correct symbol information that does not have the error, among the pieces of symbol information output by the symbol information output model, as the symbol information about the structural formula of the subject compound.

More preferably, the processor is configured to generate, from the subject image, first descriptive information describing the structural formula of the subject compound with a description method different from the line notation, by using a comparison model, generate second descriptive information describing a structural formula represented by the correct symbol information with the description method, compare the first descriptive information and the second descriptive information with each other, and output the correct symbol information as the symbol information about the structural formula of the subject compound in accordance with a degree of agreement between the first descriptive information and the second descriptive information.

More preferably, the comparison model is created through machine learning using a second learning image and descriptive information describing a structural formula of a compound shown by the second learning image with the description method.

Further, more preferably, the comparison model includes a feature value output model that outputs the feature value in response to input of the subject image, and a descriptive information output model that outputs the first descriptive information corresponding to the feature value in response to input of the feature value output from the feature value output model.

The analysis model may be created through machine learning using the learning image, symbol information representing a structural formula of a compound shown by the learning image with the line notation, and descriptive information describing the structural formula of the compound shown by the learning image with a description method different from the line notation. In this case, the analysis model may include a feature value output model that outputs the feature value in response to input of the subject image, a descriptive information output model that outputs the descriptive information about the structural formula of the subject compound in response to input of the subject image, and a symbol information output model that outputs, in response to input of combined information that is a combination of the output feature value and the output descriptive information, the symbol information corresponding to the combined information.

Further, preferably, the feature value output model outputs the feature value that is vectorized, and the descriptive information output model outputs the descriptive information formed of a vectorized molecular fingerprint.

The line notation may be a Simplified Molecular Input Line Entry System notation or a canonical Simplified Molecular Input Line Entry System notation.

The above-described object can be achieved as an image analysis method for analyzing an image showing a structural formula of a compound, a processor being configured to perform a step of generating, on the basis of a feature value of a subject image showing a structural formula of a subject compound, symbol information representing the structural formula of the subject compound with a line notation, by using an analysis model, the analysis model being created through machine learning using a learning image and symbol information representing a structural formula of a compound shown by the learning image with a line notation.

Further, a program for causing a processor to perform the step in the image analysis method described above can be implemented.

According to the present invention, it is possible to cope with a change in the way of drawing of a structural formula and to appropriately generate text information about a structural formula of a compound from an image showing the structural formula.

BRIEF DESCRIPTION OF THE DRAWINGS

FIG. 5 is a diagram for explaining a molecular fingerprint;

FIG. 6 is a diagram illustrating a state where a plurality of subject images are detected from one document;

FIG. 7 is a conceptual diagram of a comparison model; and

DESCRIPTION OF THE PREFERRED EMBODIMENTS

Figure 1:
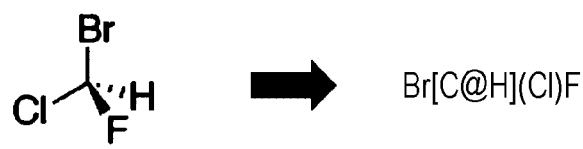
FIG. 1 is a diagram for explaining a line notation for a structural formula.

An image analysis apparatus, an image analysis method, and a program according to one embodiment of the present invention (hereinafter referred to as "present embodiment") will be described below with reference to the attached drawings.

Note that the embodiment described below is only an example provided in order to explain the present invention in an easy-to-understand manner and is not intended to limit the present invention. That is, the present invention is not limited to the embodiment described below and can be modified or changed in various manners without departing from the spirit of the present invention. As a matter of course, the present invention includes its equivalents.

Further, in the following description, unless otherwise noted, "document" and "image" are an electronic document and an electronic image (in the form of data) respectively, each of which is information (data) that can be processed by a computer.

Functions of Image Analysis Apparatus of the Present Embodiment

The image analysis apparatus of the present embodiment includes a processor and analyzes an image showing a structural formula of a compound. A main function of the image analysis apparatus of the present embodiment is a function of analyzing an image (subject image) showing a structural formula of a subject compound and generating symbol information about the structural formula shown by the subject image. A "subject compound" is a compound for which symbol information about the structural formula is generated and, for example, corresponds to an organic compound for which the structural formula is shown in an image included in a document.

An "image that shows a structural formula" is an image of a line diagram that shows the structural formula. A plurality of equivalent depiction methods are available as the depiction method for a structural formula. Examples of the depiction methods include a method in which a single-bond hydrogen atom (H) is omitted, a method in which a skeletal carbon atom (C) is omitted, and a method in which a functional group is indicated by its abbreviation. The line diagram may change in accordance with the way of drawing (for example, the thickness and length of a bond line between atoms and the orientation in which a line extends). In the present embodiment, the way of drawing of a structural formula includes the resolution of an image that shows the structural formula.

"Symbol information" is information representing a structural formula of a compound with a line notation and is formed of a plurality of symbols (for example, ASCII codes) put in sequence. Examples of the line notation include the SMILES (Simplified Molecular Input Line Entry System) notation, the canonical SMILES, the SMARTS (Smiles Arbitrary Target Specification) notation, the SLN (Sybyl Line Notation), the WLN (Wiswesser Line-Formula Notation), the ROSDAL (Representation of structure diagram arranged linearly) notation, the InChI (International Chemical Identifier), and the InChI Key (hashed InChI).

Although any of the above-described line notations may be used, the SMILES notation is preferable in that the SMILES notation is relatively simple and easy and is in widespread use. Alternatively, the canonical SMILES is also preferable in that representation is uniquely determined by taking into consideration the order and sequence of atoms in a molecule. In the present embodiment, it is assumed that symbol information representing a structural formula in accordance with the SMILES notation is generated. Representation according to the SMILES notation is hereinafter also referred to as SMILES representation.

The SMILES notation is a notation with which a structural formula of a compound is converted to symbol information (text information) in a line formed of a plurality of symbols. Symbols used in the SMILES notation represent, for example, the type of atom (element), a bond between atoms, a branched structure, and a cut position when a ring structure is cut to make a chain structure, and are determined in accordance with a predetermined rule.

As an example of a structural formula of a compound represented with the SMILES notation, that is, as an example of symbol information, (S)-bromochlorofluoromethane is illustrated in FIG. 1. In FIG. 1, the structural formula is illustrated on the left side and symbol information (the structural formula represented with the SMILES representation) is illustrated on the right side.

The image analysis apparatus of the present embodiment performs machine learning by using, as a learning data set, a learning image showing a structural formula of a compound and symbol information (ground truth label information) about the structural formula shown by the learning image. As a result of this machine learning, an analysis model that generates, on the basis of a feature value of an image showing a structural formula of a compound, symbol information about the structural formula shown by the image is created. The analysis model will be described in detail in the following section.

The image analysis apparatus of the present embodiment has a function of detecting, from a document that includes an image showing a structural formula of a compound, the image (subject image). The detected subject image is input to the analysis model described above to thereby generate symbol information about the structural formula shown by the subject image.

With the functions described above, when an image showing a structural formula of a compound is included in a document, such as a paper or a patent specification, it is possible to detect the image and convert the structural formula of the compound shown by the image to symbol information.

A structural formula converted to symbol information can be used as a search key later on, and therefore, a document including an image showing a structural formula of a target compound is easily searchable.

The image analysis apparatus of the present embodiment has a function of checking whether symbol information generated by the analysis model is correct or wrong. More specifically, in the present embodiment, a plurality of pieces of symbol information are obtained from a feature value of one subject image, and it is determined, for each of the pieces of symbol information, whether an error in terms of representation (for example, erroneous representation in terms of the SMILES notation) is present.

Further, a comparison process described below is performed for each piece of symbol information (correct symbol information) from which no error is detected. In accordance with the result of the comparison process, a predetermined number of pieces of correct symbol information are output as pieces of symbol information about the structural formula of the subject compound.

As described above, when symbol information generated by the analysis model is checked, accurate information can be obtained as symbol information about the structural formula of the subject compound.

Analysis Model

Figure 2:
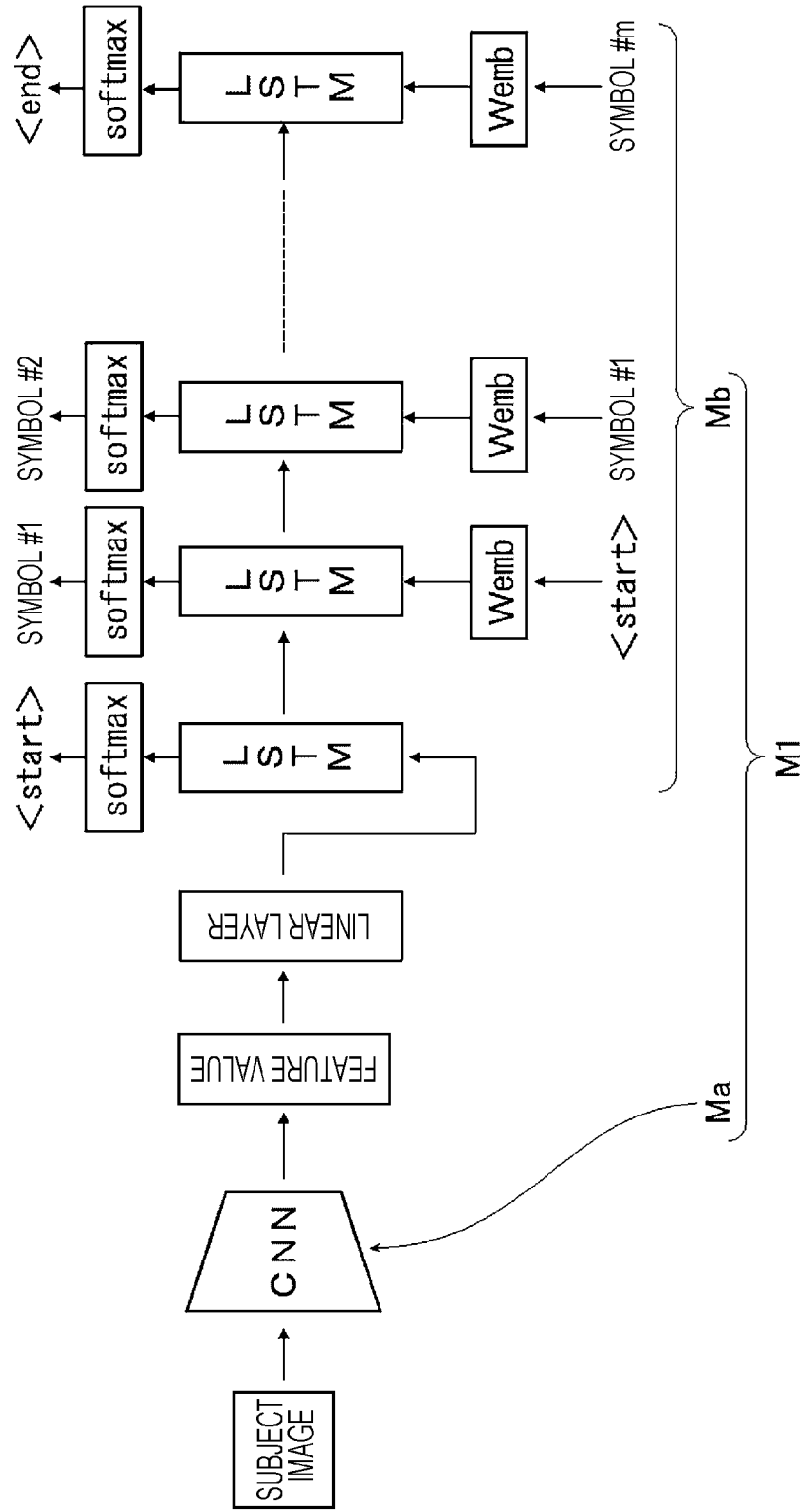
FIG. 2 is a conceptual diagram of an analysis model.

The analysis model used in the present embodiment (hereinafter referred to as an analysis model M1) will be described. As illustrated in FIG. 2, the analysis model M1 is constituted by a feature value output model Ma and a symbol information output model Mb. The analysis model M1 is created through machine learning using a plurality of learning data sets each of which is a set of a learning image showing a structural formula of a compound and symbol information (ground truth data) about the structural formula shown by the learning image.

From the viewpoint of increasing the accuracy of learning, the more the number of learning data sets used in machine learning is, the better, and the number of learning data sets is preferably 50000 or more.

In the present embodiment, the machine learning is supervised learning, and as its technique, deep learning (that is, a multi-layer neural network) is used; however, the present embodiment is not limited to this. The type (algorithm) of the machine learning may be unsupervised learning, semi-supervised learning, reinforcement learning, or transduction.

The machine learning technique may be genetic programming, inductive logic programming, a support vector machine, clustering, a Bayesian network, an extreme learning machine (ELM), or decision tree learning.

Further, as the method for minimizing an objective function (loss function) in machine learning of the neural network, the gradient descent method may be used or the backpropagation algorithm may be used.

The feature value output model Ma is a model that, in response to input of an image (subject image) showing a structural formula of a subject compound, outputs a feature value of the subject image, and is formed as, for example, a convolutional neural network (CNN) having a convolution layer and a pooling layer as a middle layer. A feature value of an image is a learning feature value in the convolutional neural network CNN and is a feature value specified in the course of typical image recognition (pattern recognition). In the present embodiment, the feature value output model Ma outputs a vectorized feature value.

In the present embodiment, as the feature value output model Ma, a network model used in image classification may be used, and examples of the network model include the 16-layer CNN (VGG16) from the Oxford Visual Geometry Group, the Inception model (GoogLeNet) from Google, the 152-layer CNN (Resnet) by Kaiming He, and the improved Inception model (Xception) by Chollet.

Although the size of an image input to the feature value output model Ma is not limited to a specific size, an image of a compound needs to have a size of, for example, 75×75 in width and length. Alternatively, for the reason of increasing the output accuracy of the model, the size of an image of a compound may be increased to a larger size (for example, 300×300). A color image needs to be converted to a monochrome image and the monochrome image needs to be input to the feature value output model Ma for the reason of reducing the computational load.

Subsequent to the convolution layer and the pooling layer repeated in the middle layer, a fully connected layer is provided. From the fully connected layer, a feature value expressed by a multidimensional vector is output. The feature value (multidimensional vector) output from the fully connected layer passes through a linear layer and is subsequently input to the symbol information output model Mb.

The symbol information output model Mb is a model that, in response to input of the feature value output from the feature value output model Ma, outputs symbol information about the structural formula of the subject compound (text information representing the structural formula with the SMILES representation). The symbol information output model Mb is formed as, for example, an LSTM (Long Short Term Memory) network, which is one type of a Recurrent Neural Network (RNN). The LSTM is obtained by replacing hidden layers in the RNN with LSTM layers.

In the present embodiment, as illustrated in FIG. 2, an embedding layer (illustrated as Wemb in FIG. 2) is provided in a stage preceding to each LSTM layer, and a specific vector can be added to an input to the LSTM layer. To an output from each LSTM layer, the softmax function (illustrated as softmax in FIG. 2) is applied, and the output from the LSTM layer is converted to a probability. The sum of n (n is a natural number) output probabilities obtained as a result of application of the softmax function is equal to 1.0. In the present embodiment, the softmax function is used to convert an output from each LSTM layer to a probability, and a loss (a gap between the result of learning and ground truth data) is calculated by using a cross-entropy loss as a loss function.

In the present embodiment, the symbol information output model Mb is formed as the LSTM network; however, the present embodiment is not limited to this. The symbol information output model Mb may be formed as a GRU (Gated Recurrent Unit).

The analysis model M1 configured as described above generates, in response to input of a subject image to the analysis model M1, a plurality of pieces of symbol information about the structural formula of the subject compound on the basis of a feature value of the subject image.

The procedure for generating symbol information will be described. In response to input of a subject image to the feature value output model Ma, the feature value output model Ma outputs a feature value of the subject image, and the feature value is input to the symbol information output model Mb. The symbol information output model Mb specifies symbols that form symbol information corresponding to the input feature value sequentially from the start of the symbol information and outputs the symbol information that includes the sequence of symbols in order of specification.

More specifically, when outputting symbol information formed of m (m is a natural number greater than or equal to 2) symbols, the symbol information output model Mb outputs, for each of the 1st to m-th symbols, a plurality of candidates from a corresponding LSTM layer. Based on combinations of the candidates specified for each of the 1st to m-th symbols, pieces of symbol information are determined. For example, a case of m=3 is assumed where the number of candidates for the 1st symbol is three, the number of candidates for the 2nd symbol is four, and the number of candidates for the 3rd symbol is five. Then, 60 (3×4×5) different pieces of symbol information are determined.

The number of combinations of symbols (that is, the number of pieces of symbol information) is not limited to the number of combinations of all of the plurality of candidates specified for each of the 1st to m-th symbols. For example, for reducing the computational load, a search algorithm, such as a beam search, is applied to a plurality of candidates specified for each of the 1st to m-th symbols, and the top K (K is a natural number) symbols among the plurality of candidates may be employed.

Next, the symbol information output model Mb calculates, for each piece of symbol information, the output probability of each of the m symbols that form the piece of symbol information. For example, when j (j is a natural number) candidates are output for the i-th (i=1 to m) symbol in a piece of symbol information about the structural formula of the subject compound, the output probabilities $P_{i1}$, $P_{i2}$, $P_{i3}$, . . . , $P_{ij}$ of the j symbols are calculated by using the softmax function described above.

Subsequently, the symbol information output model Mb calculates the output score of each piece of symbol information on the basis of the calculated output probabilities of the respective symbols. The output score is the sum of the output probabilities of the m symbols that form the piece of symbol information. However, the output score is not limited to this, and the product of the output probabilities of the m symbols that form each piece of symbol information may be used as the output score.

In accordance with the calculated output scores, the symbol information output model Mb outputs a predetermined number of pieces of symbol information. In the present embodiment, Q pieces of symbol information are output in descending order of the calculated output score. The number of pieces of output symbol information, that is, Q, may be determined as desired and is preferably, for example, 2 to 20. However, the number is not limited to this, and only one piece of symbol information having the highest output score may be output for the structural formula of the subject compound. Alternatively, a number of pieces of symbol information corresponding to the number of combinations of all candidates for each symbol may be output.

Configuration of Image Analysis Apparatus of the Present Embodiment

Figure 3:
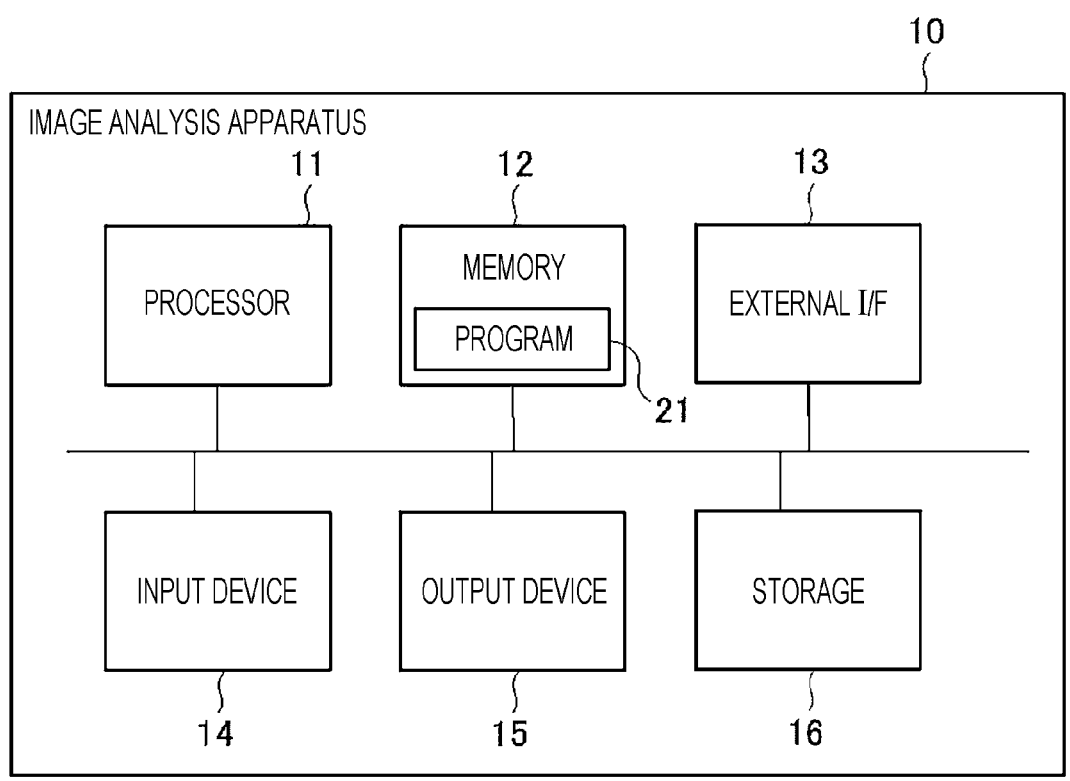
FIG. 3 is a diagram illustrating a hardware configuration of an image analysis apparatus according to one embodiment of the present invention.

Now, an example configuration of the image analysis apparatus (hereinafter referred to as an image analysis apparatus 10) of the present embodiment will be described with reference to FIG. 3. In FIG. 3, an external interface is illustrated as "external I/F".

As illustrated in FIG. 3, the image analysis apparatus 10 is a computer including a processor 11, a memory 12, an external interface 13, an input device 14, an output device 15, and a storage 16, which are electrically connected to each other. Although the image analysis apparatus 10 is constituted by a single computer in the configuration illustrated in FIG. 3, the image analysis apparatus 10 may be constituted by a plurality of computers.

The processor 11 is configured to execute a program 21 described below to perform a series of processes related to image analysis. The processor 11 is constituted by one or more CPUs (central processing units) and the program 21 described below.

The hardware processor that constitutes the processor 11 is not limited to a CPU and may be an FPGA (field-programmable gate array), a DSP (digital signal processor), an ASIC (application-specific integrated circuit), a GPU (graphics processing unit), an MPU (micro-processing unit), another type of IC (integrated circuit), or a combination thereof. The processor 11 may be a single IC (integrated circuit) chip, typically, an SoC (system on chip), that implements the overall functions of the image analysis apparatus 10.

Note that the above-described hardware processor may be an electric circuit (circuitry) that is a combination of circuit elements, such as semiconductor elements.

The memory 12 is constituted by semiconductor memories, such as a ROM (read-only memory) and a RAM (random access memory), temporarily stores a program and data to thereby provide a work area of the processor 11, and temporarily stores various types of data generated as a result of processes performed by the processor 11.

The program stored in the memory 12 includes the program 21 for image analysis. The program 21 includes a program for performing machine learning to create the analysis model M1, a program for detecting a subject image from a document, and a program for the analysis model M1 to generate from a feature value of the subject image, symbol information about the structural formula of the subject compound. In the present embodiment, the program 21 further includes a program for performing a determination process and a comparison process for the generated symbol information.

Note that the program 21 may be obtained by reading from a computer-readable recording medium (medium) or may be obtained by receipt (download) via a network, such as the Internet or an intranet.

The external interface 13 is an interface for connecting with an external apparatus. The image analysis apparatus 10 communicates with an external apparatus, such as a scanner or another computer on the Internet, via the external interface 13. Through such communication, the image analysis apparatus 10 can obtain some or all data for machine learning and obtain a document into which a subject image is inserted.

The input device 14 is constituted by, for example, a mouse and a keyboard and accepts an input operation by a user. The image analysis apparatus 10 can obtain some data for machine learning by, for example, the user using the input device 14 and inputting text information corresponding to symbol information.

The output device 15 is constituted by, for example, a display and a speaker and is a device that displays or outputs by sound reproduction, symbol information generated by the analysis model M1.

The storage 16 is constituted by, for example, a flash memory, an HDD (hard disc drive), an SSD (solid state drive), an FD (flexible disc), an MO disc (magneto-optical disc), a CD (compact disc), a DVD (digital versatile disc), an SD card (Secure Digital card), or a USB memory (Universal Serial Bus memory). In the storage 16, various types of data including data for machine learning are stored. In the storage 16, the analysis model M1 and data of various models created through machine learning are also stored. Further, symbol information about a structural formula of a subject compound generated by the analysis model M1 may be stored in the storage 16 and registered in a database.

In the present embodiment, the storage 16 is a device incorporated into the image analysis apparatus 10; however, the present embodiment is not limited to this. The storage 16 may be an external device connected to the image analysis apparatus 10. The storage 16 may be an external computer (for example, a server computer for a cloud service) connected via a network such that communication is possible.

The hardware configuration of the image analysis apparatus 10 is not limited to the above-described configuration, and any structural device can be added, omitted, or replaced as appropriate in accordance with the specific embodiment.

Flow of Image Analysis

Now, a flow of image analysis using the image analysis apparatus 10 will be described.

In the flow of image analysis described below, the image analysis method of the present invention is employed. That is, a description given below includes a description of the image analysis method of the present invention. Further, steps in the flow of image analysis constitute the image analysis method of the present invention.

Figure 4:
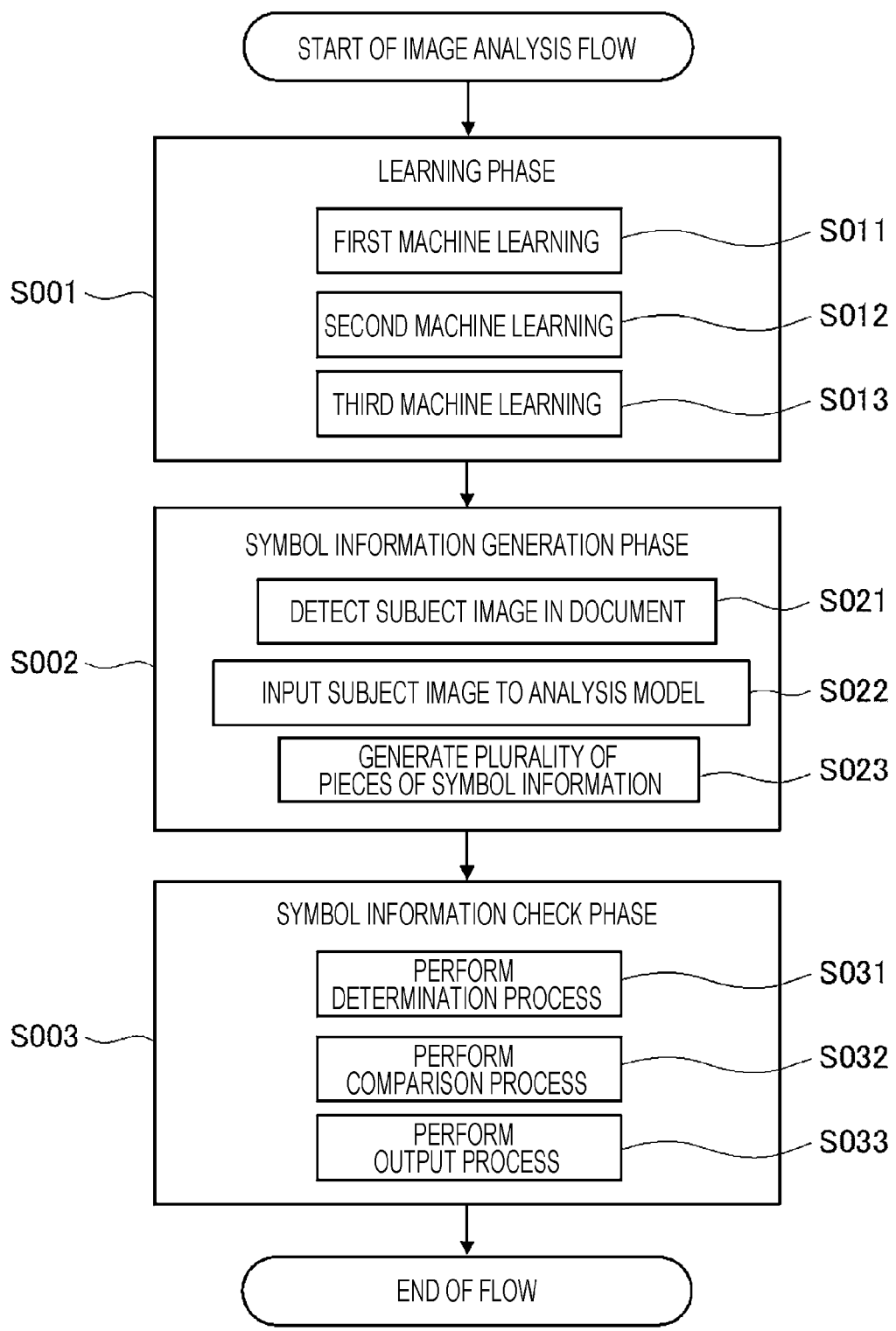
FIG. 4 is a diagram illustrating a flow of image analysis.

The flow of image analysis of the present embodiment proceeds in the order of a learning phase S001, a symbol information generation phase S002, and a symbol information check phase S003 as illustrated in FIG. 4. Each of the phases will be described below.

Learning Phase

The learning phase S001 is a phase in which machine learning is performed to create models necessary in the subsequent phases. In the learning phase S001, first machine learning S011, second machine learning S012, and third machine learning S013 are performed as illustrated in FIG. 4.

The first machine learning S011 is machine learning for creating the analysis model M1 and is performed by using a learning image and symbol information about a structural formula of a compound shown by the learning image as a learning data set as described above.

The second machine learning S012 is machine learning for creating a comparison model used in the symbol information check phase S003. The comparison model is a model that generates, from a subject image, descriptive information that describes the structural formula of the subject compound with a description method different from the line notation described above.

Examples of the description method different from the line notation include a description method using a molecular fingerprint. A molecular fingerprint is used to identify a molecule having a specific feature and is obtained by converting a structural formula to a binary multidimensional vector indicating the presence or absence of each type of partial structure (fragment) in the structural formula as illustrated in FIG. 5. The partial structure is an element that represents a part of the structural formula and includes a plurality of atoms and bonds between the atoms.

The number of dimensions of a vector that forms a molecular fingerprint can be determined as desired and is set to, for example, several tens to several thousands. In the present embodiment, a molecular fingerprint expressed by a 167-dimensional vector is used as in the MACCS Keys, which is a typical fingerprint.

Note that the description method different from the line notation is not limited to the method using a molecular fingerprint and may be the other description methods, that is, for example, description methods using the KEGG (Kyoto Encyclopedia of Genes and Genomes) Chemical Function format (KCF format), the MOL format, which is an input format of a chemical structure database (MACCS) operated by Molecular Design Limited, and the SDF format, which is a modification of the MOL.

The second machine learning S012 is performed by using, as a learning data set, a learning image (second learning image) showing a structural formula of a compound and descriptive information (specifically, descriptive information formed of a molecular fingerprint) about the structural formula shown by the second learning image. The second learning image used in the second machine learning S012 may be an image the same as the learning image used in the first machine learning S011 or may be an image provided separately from the learning image used in the first machine learning S011.

When the second machine learning S012 is performed by using the above-described learning data, the comparison model is created. The comparison model will be described in detail below.

The third machine learning S013 is machine learning for creating a model (hereinafter referred to as an image detection model) that detect an image showing a structural formula of a compound from a document into which the image is inserted. The image detection model is a model that detects an image of a structural formula from a document by using an object detection algorithm. As the object detection algorithm, for example, R-CNN (Region-based CNN), Fast R-CNN, YOLO (You Only Look Once), and SSD (Single Shot Multibox Detector) are available. In the present embodiment, an image detection model using YOLO is created from the viewpoint of the detection speed.

Learning data (teaching data) used in the third machine learning S013 is created by applying an annotation tool to a learning image showing a structural formula of a compound. The annotation tool is a tool for adding to subject data, a ground truth label (tag) and related information including the coordinates of the subject as an annotation. When the annotation tool is activated, a document including a learning image is displayed, a region showing a structural formula of a compound is enclosed by a bounding box, and annotation is performed for the region, learning data is created.

As the annotation tool, for example, labelImg from tzutalin and VoTT from Microsoft are available.

When the third machine learning S013 is performed by using the above-described learning data, the image detection model, which is an object detection model in the YOLO format, is created.

Symbol Information Generation Phase

The symbol information generation phase S002 is a phase in which an image (subject image) of a structural formula of a subject compound included in a document is analyzed and symbol information about the structural formula of the subject compound is generated.

In the symbol information generation phase S002, first, the processor 11 of the image analysis apparatus 10 applies the image detection model described above to a document that includes a subject image and detects the subject image in the document (S021). That is, in step S021, the processor 11 uses the object detection algorithm (specifically, YOLO) and detects the subject image from the document.

When a plurality of subject images are included in one document, the processor 11 detects the plurality of subject images (images of parts outlined by dashed lines in FIG. 6) from the document as illustrated in FIG. 6.

Next, the processor 11 inputs the detected subject image to the analysis model M1 (S022). The feature value output model Ma, which is the preceding stage in the analysis model M1, outputs a feature value of the subject image, and the symbol information output model Mb, which is the succeeding stage therein, outputs, on the basis of input of the feature value of the subject image, symbol information about the structural formula of the subject compound. At this time, as described above, a predetermined number of pieces of symbol information are output in descending order of the output score. As described above, the processor 11 generates a plurality of pieces of symbol information about the structural formula of the subject compound on the basis of the feature value of the subject image by using the analysis model M1 (S023).

When a plurality of subject images are detected in step S021, the processor 11 inputs the plurality of detected subject images to the analysis model M1 on a subject image by subject image basis. In this case, for a structural formula of a subject compound shown by each subject image among the plurality of subject images, a plurality of pieces of symbol information are generated for the subject image.

Symbol Information Check Phase

The symbol information check phase S003 is a phase in which a determination process and a comparison process are performed for each of the plurality of pieces of symbol information generated for the structural formula of the subject compound generated in the symbol information generation phase S002.

In the symbol information check phase S003, first, the processor 11 performs a determination process (S031). The determination process is a process of determining, for each of the predetermined number of pieces of symbol information output from the symbol information output model Mb in the analysis model M1, whether an error in terms of the SMILES representation is present.

More specifically, to determine, for each piece of symbol information output by the symbol information output model Mb, whether a string of characters that form the piece of symbol information is in a correct order based on the SMILES representation, the processor 11 attempts to convert the string of characters to a structural formula. When conversion to a structural formula is successful, it is determined that the piece of symbol information does not have an error in terms of representation (in other words, the piece of symbol information is correct). Symbol information having no error is hereinafter referred to as "correct symbol information".

As the algorithm for converting a string of characters to a structural formula, an algorithm similar to a conversion function included in publicly available structural formula drawing software, such as ChemDraw (registered trademark) or RDKit, can be used.

After the determination process, the processor 11 performs a comparison process for correct symbol information (S032). The comparison process is a process of comparing first descriptive information about the structural formula of the subject compound generated by the comparison model and second descriptive information generated from correct symbol information with each other. The first descriptive information is information that describes the structural formula of the subject compound with the description method using a molecular fingerprint. In the present embodiment, the first descriptive information is generated by inputting the subject image to a comparison model M2 illustrated in FIG. 7.

The comparison model M2 is created through the second machine learning S012 described above and includes a feature value output model Mc and a descriptive information output model Md as illustrated in FIG. 7.

The feature value output model Mc is a model that, in response to input of an image (subject image) showing a structural formula of a subject compound, outputs a feature value of the subject image as in the feature value output model Ma in the analysis model M1 and, in the present embodiment, is formed as a CNN. In the present embodiment, the feature value output model Mc outputs a vectorized feature value as in the feature value output model Ma.

The descriptive information output model Md is a model that, in response to input of the feature value output from the feature value output model Mc, outputs descriptive information (specifically, descriptive information formed of a molecular fingerprint) corresponding to the feature value. In the present embodiment, the descriptive information output model Md is formed as, for example, a neural network (NN). The descriptive information output model Md outputs descriptive information formed of a vectorized molecular fingerprint as the first descriptive information. The descriptive information output from the descriptive information output model Md is descriptive information about the structural formula of the subject compound.

Note that as the feature value output model Mc in the comparison model M2, the feature value output model Ma in the analysis model M1 may be used. That is, the weight of the middle layer in the CNN is set to a value common to the feature value output models Ma and Mc. In this case, in the second machine learning S012, the weight of the middle layer of the CNN that is determined in the first machine learning S011 is kept fixed, and the weight of the middle layer of the NN, which is the descriptive information output model Md, is determined, and therefore, the load (computational load) for model creation can be reduced. However, the comparison model M2 need not include the CNN (feature value output model Ma) in the analysis model M1 and may include a separate CNN.

The second descriptive information is descriptive information that describes the structural formula represented by the correct symbol information with the description method using a molecular fingerprint. In the present embodiment, the second descriptive information is generated by converting the symbol information based on the SMILES representation to a molecular fingerprint in accordance with a conversion rule. The conversion rule used at this time is defined by specifying, for a large number of compounds, correspondences between the structural formulae based on the SMILES representation and molecular fingerprints and establishing a rule on the correspondences.

In the comparison process, the first descriptive information and the second descriptive information thus generated are compared with each other, and the degree of agreement between the first descriptive information and the second descriptive information is calculated. When a plurality of pieces of correct symbol information are present, a piece of second descriptive information is generated from each of the pieces of correct symbol information, and the degree of agreement with the first descriptive information is calculated for each piece of second descriptive information. As the method for calculating the degree of agreement, a publicly available method for calculating the degree of similarity between molecular fingerprints can be used and, for example, the method of calculating the Tanimoto coefficient can be used.

After the comparison process, the processor 11 performs an output process (S033). The output process is a process of finally outputting (for example, displaying) the correct symbol information as symbol information about the structural formula of the subject compound in accordance with the degree of agreement calculated in the comparison process. Outputting the correct symbol information in accordance with the degree of agreement may be, for example, outputting only a piece of correct symbol information for which the degree of agreement exceeds a reference value or may be outputting pieces of correct symbol information in descending order of the degree of agreement.

Effectiveness of the Present Embodiment

The image analysis apparatus 10 of the present embodiment can generate, on the basis of a feature value of a subject image showing a structural formula of a subject compound, symbol information that represents the structural formula with the SMILES representation, by using the analysis model M1 created through the first machine learning. As a result, it is possible to appropriately cope with a change in the way of drawing of a structural formula in a subject image.

The above-described effects will be described in detail below. In the related art, a rule is established on correspondences between parts in an image showing a structural formula of a compound and partial structures, in the structural formula, present in the respective parts. Then, the structural formula is identified in accordance with the identification rule. However, when the way of drawing of the structural formula is changed, it might not be possible to identify the structural formula unless an identification rule adaptable to the way of drawing is established. As a result, in the above-described situation, it is difficult to generate symbol information about the structural formula.

In contrast, in the present embodiment, symbol information is generated from a feature value of a subject image by using the analysis model M1, which is the outcome of machine learning. That is, in the present embodiment, even when the way of drawing of a structural formula is changed, a feature value of an image showing the structural formula can be specified. When the feature value can be specified, symbol information can be generated from the feature value.

As described above, according to the present embodiment, even when the way of drawing of a structural formula of a subject compound is changed, symbol information can be appropriately obtained.

Other Embodiments

Although the image analysis apparatus, the image analysis method, and the program of the present invention have been described above with specific examples, the above-described embodiment is only an example and other embodiments may be possible.

For example, the computer that constitutes the image analysis apparatus may be a server used in, for example, an ASP (Application Service Provider), SaaS (Software as a Service), a PaaS (Platform as a Service), or an IaaS (Infrastructure as a Service). In this case, a user using a service, such a service of an ASP described above, operates a terminal not illustrated and transmits a document including a subject image to the server. When receiving the document transmitted from the user, the server detects the subject image from the document and generates symbol information about a structural formula of a subject compound shown by the subject image on the basis of a feature value of the subject image. The server outputs (transmits) the generated symbol information to the user's terminal. On the user's side, the symbol information transmitted from the server is displayed or output by sound reproduction.

In the above-described embodiment, the determination process of determining whether an error in terms of representation is present is performed for symbol information generated by the analysis model M1. Further, in the above-described embodiment, the comparison process of comparing a molecular fingerprint (first descriptive information) generated on the basis of the feature value of the subject image and a molecular fingerprint (second descriptive information) converted from correct symbol information with each other is performed.

However, the present embodiment is not limited to this, and only one of the determination process or the comparison process may be performed, or the determination process or the comparison process need not be performed.

In the above-described embodiment, machine learning (first to third machine learning) for creating various models is performed by the image analysis apparatus 10; however, the present embodiment is not limited to this. The machine learning may be performed, in part or in whole, by an apparatus (computer) other than the image analysis apparatus 10. In this case, the image analysis apparatus 10 obtains a model created through machine learning performed by the other apparatus.

For example, when the first machine learning is performed by the other apparatus, the image analysis apparatus 10 obtains the analysis model M1 created through the first machine learning from the other apparatus. The image analysis apparatus 10 analyzes a subject image and generates symbol information about a structural formula of a subject compound shown by the image by using the obtained analysis model M1.

In the above-described embodiment, the analysis model M1 described above is created through machine learning using a learning image and symbol information representing a structural formula of a compound shown by the learning image with the line notation. The analysis model M1 generates symbol information about a structural formula of a subject compound shown by a subject image on the basis of a feature value of the subject image.

However, the present embodiment is not limited to this. As the analysis model that generates symbol information about a structural formula of a subject compound, another model is possible. Examples of the other model include an analysis model (hereinafter referred to as an analysis model M3 according to a modification) illustrated in FIG. 8.

Figure 8:
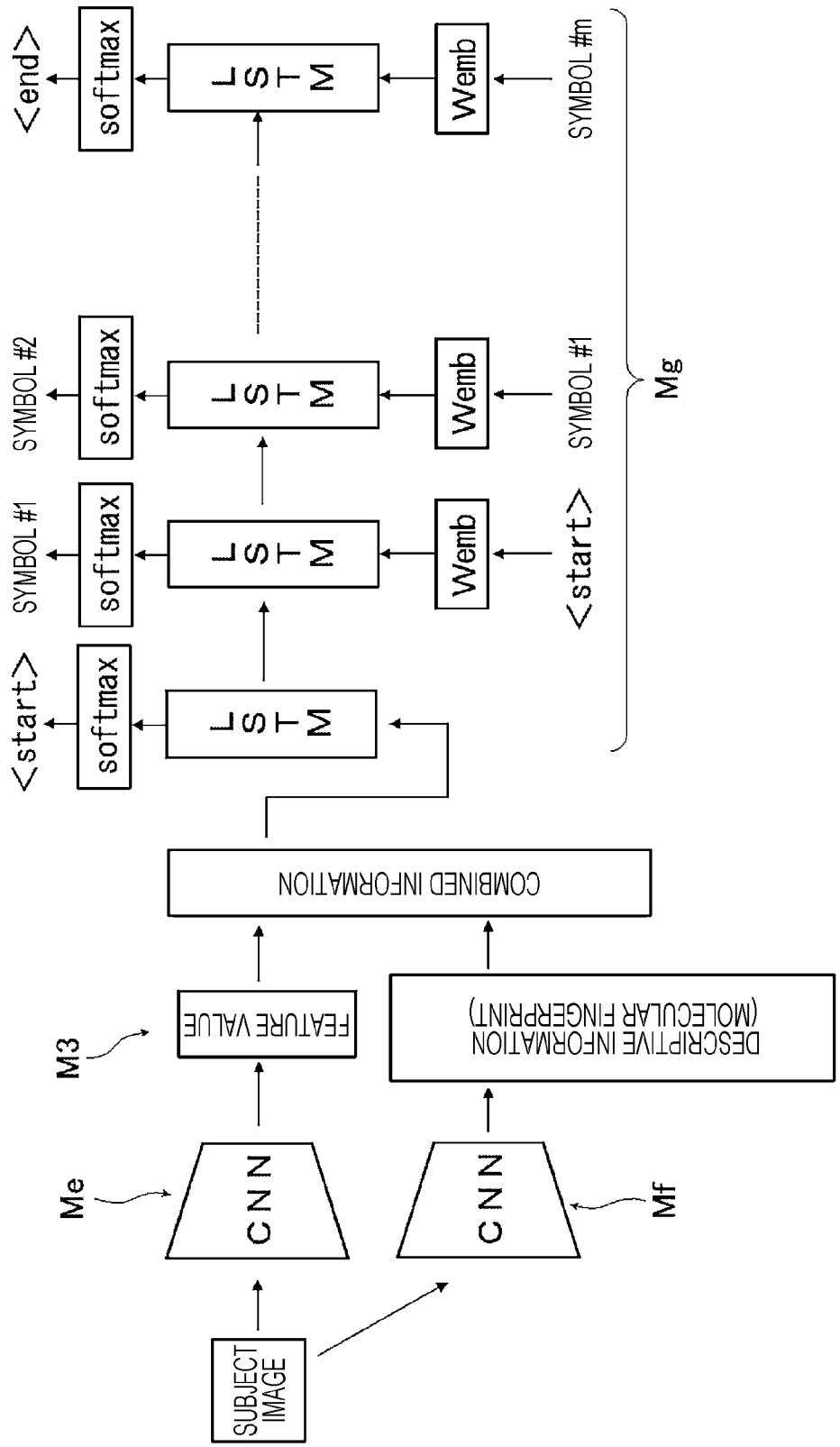
FIG. 8 is a conceptual diagram of an analysis model according to a modification.

The analysis model M3 according to the modification has a feature value output model Me, a descriptive information output model Mf, and a symbol information output model Mg as illustrated in FIG. 8. The analysis model M3 according to the modification is created through machine learning (hereinafter referred to as machine learning according to the modification). The machine learning according to the modification is performed by using, as a learning data set, a learning image showing a structural formula of a compound, symbol information (for example, symbol information based on the SMILES representation) about the structural formula of the compound shown by the learning image, and descriptive information (for example, descriptive information formed of a molecular fingerprint) about the structural formula of the compound shown by the learning image.

The feature value output model Me outputs, in response to input of an image (subject image) showing a structural formula of a subject compound, a feature value of the subject image as in the feature value output model Ma in the analysis model M1 and is formed as, for example, a CNN. The feature value output model Me outputs a vectorized feature value (for example, a 2048-dimensional vector).

The descriptive information output model Mf is a model that, in response to input of the subject image, outputs descriptive information (specifically, descriptive information formed of a molecular fingerprint) about the structural formula of the subject compound. The descriptive information output model Mf is a model similar to the comparison model M2 described above, is formed as, for example, a CNN, and outputs descriptive information formed of a vectorized molecular fingerprint (for example, a 167-dimensional vector).

In the analysis model M3 according to the modification, as illustrated in FIG. 8, the feature value output from the feature value output model Me and the descriptive information output from the descriptive information output model Mf are combined, and vectorized combined information is generated. The number of vector dimensions of the combined information is equal to a value obtained by adding up the number of vector dimensions of the feature value and the number of vector dimensions of the descriptive information (that is, 2215 dimensions).

The symbol information output model Mg is a model that, in response to input of the above-described combined information, outputs symbol information (specifically, symbol information based on the SMILES representation) corresponding to the combined information. The symbol information output model Mg is substantially the same as the symbol information output model Mb in the analysis model M1 and is formed as, for example, an RNN. As the RNN, for example, an LSTM network can be used.

Even when the analysis model M3 according to the modification configured as described above is used, symbol information representing a structural formula of a subject compound with the line notation can be generated from a feature value of the subject image.

REFERENCE SIGNS LIST 10 image analysis apparatus
11 processor 12 memory
13 external interface
14 input device
15 output device
16 storage
21 program
M1 analysis model
M2 comparison model
M3 analysis model according to modification
Ma, Mc, Me feature value output model
Mb, Mg symbol information output model
Md, Mf descriptive information output model

What is claimed is:

1. An image analysis apparatus comprising a processor and configured to analyze an image showing a structural formula of a compound,
the processor being configured to generate, on the basis of a feature value of a subject image showing a structural formula of a subject compound, symbol information representing the structural formula of the subject compound with a line notation, by using an analysis model,
the analysis model being created through machine learning using a learning image and symbol information representing a structural formula of a compound shown by the learning image with a line notation,
wherein the analysis model includes a feature value output model that outputs the feature value in response to input of the subject image and a symbol information output model that outputs the symbol information corresponding to the feature value in response to input of the feature value, wherein the feature value output model includes a convolutional neural network, and the symbol information output model includes a recurrent neural network,
wherein the symbol information about the structural formula of the subject compound is formed of a plurality of symbols, and the symbol information output model specifies the symbols that form the symbol information corresponding to the feature value sequentially from a start of the symbol information and outputs the symbol information that includes a sequence of the symbols in order of specification, and
the processor being configured to generate a plurality of pieces of symbol information, each of which is the symbol information, about the structural formula of the subject compound on the basis of the feature value of the subject image by using the analysis model,
wherein the symbol information output model calculates, for each piece of symbol information among the plurality of pieces of symbol information, output probabilities of the plurality of symbols that form the piece of symbol information, calculates an output score of the piece of symbol information on the basis of the calculated output probabilities of the plurality of symbols, and outputs a predetermined number of pieces of symbol information in accordance with the calculated output score.

2. The image analysis apparatus according to claim 1, wherein
the processor is configured to
detect the subject image from a document including the subject image, and
generate the symbol information about the structural formula of the subject compound by inputting the detected subject image to the analysis model.

3. The image analysis apparatus according to claim 2, wherein
the processor is configured to detect the subject image from the document by using an object detection algorithm.

4. The image analysis apparatus according to claim 2, wherein
the processor is configured to
detect a plurality of subject images, each of which is the subject image, from the document that includes the plurality of subject images, and
generate the symbol information about the structural formula of the subject compound shown by each of the plurality of subject images, by inputting the plurality of detected subject images to the analysis model on a subject image by subject image basis.

5. The image analysis apparatus according to claim 1, wherein the processor is configured to
perform a determination process of determining, for each of the pieces of symbol information output by the symbol information output model, whether an error in terms of representation is present, and
output correct symbol information that does not have the error, among the pieces of symbol information output by the symbol information output model, as the symbol information about the structural formula of the subject compound.

6. The image analysis apparatus according to claim 5, wherein
the processor is configured to
generate, from the subject image, first descriptive information describing the structural formula of the subject compound with a description method different from the line notation, by using a comparison model,
generate second descriptive information describing a structural formula represented by the correct symbol information with the description method,
compare the first descriptive information and the second descriptive information with each other, and
output the correct symbol information as the symbol information about the structural formula of the subject compound in accordance with a degree of agreement between the first descriptive information and the second descriptive information.

7. The image analysis apparatus according to claim 6, wherein the comparison model is created through machine learning using a second learning image and descriptive information describing a structural formula of a compound shown by the second learning image with the description method.

8. The image analysis apparatus according to claim 7, wherein
the comparison model includes
another feature value output model that outputs the feature value in response to input of the subject image, and
a descriptive information output model that outputs the first descriptive information corresponding to the feature value in response to input of the feature value output from the another feature value output model.

9. The image analysis apparatus according to claim 1, wherein
the analysis model is created through machine learning using the learning image, the symbol information representing a structural formula of a compound shown by the learning image with the line notation, and descriptive information describing the structural formula of the compound shown by the learning image with a description method different from the line notation, and
the analysis model further includes
a symbol information output model that outputs, in response to input of combined information that is a combination of the output feature value and the output descriptive information, the symbol information corresponding to the combined information.

10. The image analysis apparatus according to claim 9, wherein
the feature value output model outputs the feature value that is vectorized, and
the descriptive information output model outputs the descriptive information formed of a vectorized molecular fingerprint.

11. The image analysis apparatus according to claim 1, wherein
the line notation is a Simplified Molecular Input Line Entry Systemnotation or a canonical Simplified Molecular Input Line Entry System notation.

12. An image analysis method for analyzing an image showing a structural formula of a compound, the image analysis method comprising:
generating, on the basis of a feature value of a subject image showing a structural formula of a subject compound, symbol information representing the structural formula of the subject compound with a line notation, by using an analysis model,
the analysis model being created through machine learning using a learning image and symbol information representing a structural formula of a compound shown by the learning image with a line notation,
wherein the analysis model includes a feature value output model that outputs the feature value in response to input of the subject image and a symbol information output model that outputs the symbol information corresponding to the feature value in response to input of the feature value, wherein the feature value output model includes a convolutional neural network, and the symbol information output model includes a recurrent neural network,
wherein the symbol information about the structural formula of the subject compound is formed of a plurality of symbols, and the symbol information output model specifies the symbols that form the symbol information corresponding to the feature value sequentially from a start of the symbol information and outputs the symbol information that includes a sequence of the symbols in order of specification; and
generating a plurality of pieces of symbol information, each of which is the symbol information, about the structural formula of the subject compound on the basis of the feature value of the subject image by using the analysis model,
wherein the symbol information output model calculates, for each piece of symbol information among the plurality of pieces of symbol information, output probabilities of the plurality of symbols that form the piece of symbol information, calculates an output score of the piece of symbol information on the basis of the calculated output probabilities of the plurality of symbols, and outputs a predetermined number of pieces of symbol information in accordance with the calculated output score.

13. A non-transitory computer-readable medium storing a program for causing a processor to:
generate, on the basis of a feature value of a subject image showing a structural formula of a subject compound, symbol information representing the structural formula of the subject compound with a line notation, by using an analysis model,
the analysis model being created through machine learning using a learning image and symbol information representing a structural formula of a compound shown by the learning image with a line notation,
wherein the analysis model includes a feature value output model that outputs the feature value in response to input of the subject image and a symbol information output model that outputs the symbol information corresponding to the feature value in response to input of the feature value, wherein the feature value output model includes a convolutional neural network, and the symbol information output model includes a recurrent neural network,
wherein the symbol information about the structural formula of the subject compound is formed of a plurality of symbols, and the symbol information output model specifies the symbols that form the symbol information corresponding to the feature value sequentially from a start of the symbol information and outputs the symbol information that includes a sequence of the symbols in order of specification; and
generate a plurality of pieces of symbol information, each of which is the symbol information, about the structural formula of the subject compound on the basis of the feature value of the subject image by using the analysis model,
wherein the symbol information output model calculates, for each piece of symbol information among the plurality of pieces of symbol information, output probabilities of the plurality of symbols that form the piece of symbol information, calculates an output score of the piece of symbol information on the basis of the calculated output probabilities of the plurality of symbols, and outputs a predetermined number of pieces of symbol information in accordance with the calculated output score.

14. An image analysis apparatus comprising a processor and configured to analyze an image showing a structural formula of a compound,
the processor being configured to generate, on the basis of a feature value of a subject image showing a structural formula of a subject compound, symbol information representing the structural formula of the subject compound with a line notation, by using an analysis model,
the analysis model being created through machine learning using a learning image and symbol information representing a structural formula of a compound shown by the learning image with a line notation,
wherein the analysis model includes a feature value output model that outputs the feature value in response to input of the subject image and a symbol information output model that outputs the symbol information corresponding to the feature value in response to input of the feature value, wherein the feature value output model includes a convolutional neural network, and the symbol information output model includes a recurrent neural network,
the processor being configured to perform a determination process of determining, for each of the pieces of symbol information output by the symbol information output model, whether an error in terms of representation is present, and output correct symbol information that does not have the error, among the pieces of symbol information output by the symbol information output model, as the symbol information about the structural formula of the subject compound, the processing being configured to generate, from the subject image, first descriptive information describing the structural formula of the subject compound with a description method different from the line notation, by using a comparison model, generate second descriptive information describing a structural formula represented by the correct symbol information with the description method, compare the first descriptive information and the second descriptive information with each other, and output the correct symbol information as the symbol information about the structural formula of the subject compound in accordance with a degree of agreement between the first descriptive information and the second descriptive information.

15. An image analysis apparatus comprising a processor and configured to analyze an image showing a structural formula of a compound, the processor being configured to generate, on the basis of a feature value of a subject image showing a structural formula of a subject compound, symbol information representing the structural formula of the subject compound with a line notation, by using an analysis model, the analysis model being created through machine learning using a learning image and symbol information representing a structural formula of a compound shown by the learning image with a line notation, and descriptive information describing the structural formula of the compound shown by the learning image with a description method different from the line notation, and wherein the analysis model includes a feature value output model that outputs the feature value in response to input of the subject image, a descriptive information output model that outputs the descriptive information about the structural formula of the subject compound in response to input of the subject image, and a symbol information output model that outputs, in response to input of combined information that is a combination of the output feature value and the output descriptive information, the symbol information corresponding to the combined information, wherein the feature value output model includes a convolutional neural network, and the symbol information output model includes a recurrent neural network.

* * * * *